US011102287B2

United States Patent
Chin et al.

(10) Patent No.: US 11,102,287 B2
(45) Date of Patent: *Aug. 24, 2021

(54) MINIMIZING SERVICE RESTART BY OPTIMALLY RESIZING SERVICE POOLS

(71) Applicant: International Business Machines Corporation, Armonk, NY (US)

(72) Inventors: Alicia E. Chin, Markham (CA); Yonggang Hu, Toronto (CA); Jason T S Lam, Markham (CA); Zhimin Lin, Scarborough (CA); Ajith Shanmuganathan, Markham (CA)

(73) Assignee: International Business Machines Corporation, Armonk, NY (US)

( * ) Notice: Subject to any disclaimer, the term of this patent is extended or adjusted under 35 U.S.C. 154(b) by 22 days.

This patent is subject to a terminal disclaimer.

(21) Appl. No.: 16/373,779

(22) Filed: Apr. 3, 2019

(65) Prior Publication Data
US 2019/0230155 A1 Jul. 25, 2019

Related U.S. Application Data

(63) Continuation of application No. 15/427,113, filed on Feb. 8, 2017, now Pat. No. 10,284,637, which is a
(Continued)

(51) Int. Cl.
H04L 29/08 (2006.01)
G06F 9/50 (2006.01)
(Continued)

(52) U.S. Cl.
CPC .......... *H04L 67/1012* (2013.01); *G06F 9/00* (2013.01); *G06F 9/46* (2013.01); *G06F 9/5055* (2013.01);
(Continued)

(58) Field of Classification Search
CPC .................................................. H04L 67/1012
See application file for complete search history.

(56) References Cited

U.S. PATENT DOCUMENTS 6,868,441 B2 3/2005 Greene et al.
7,051,188 B1 5/2006 Kubala et al.
(Continued)

FOREIGN PATENT DOCUMENTS

EP 2098984 A1 9/2009
WO 2012028214 A1 3/2012

OTHER PUBLICATIONS

Chen, et al, "AppRAISE: Application-Level Performance Management in Virtualized Server Environments", IEEE Transactions on Network and Service Management, vol. 6, No. 4, Dec. 2009, <http://ieeexplore.ieee.org/xpls/abs_all?arnumber+4100348>.
(Continued)

*Primary Examiner* — Esther B. Henderson
(74) *Attorney, Agent, or Firm* — David K. Mattheis; Maeve M. Carpenter

(57) ABSTRACT

A method, computer program product, and system for optimizing service pools supporting resource sharing and enforcing SLAs, to minimize service restart. A computer processor determines a first resource to be idle, wherein a service instance continues to occupy the first resource that is idle. The processor adds the first resource to a resource pool, wherein the service instance continues to occupy the first resource as a global standby service instance on the first resource. The processor receives a request for a resource, wherein the request for the resource includes a global name associated with a service that corresponds to the global standby service instance, and the processor allocates, from the resource pool, the first resource having the global standby service instance, based on the request for the
(Continued)

resource that includes the global name associated with the service corresponding to the global standby service instance.

20 Claims, 4 Drawing Sheets

Related U.S. Application Data continuation of application No. 14/162,057, filed on Jan. 23, 2014, now Pat. No. 9,596,148, which is a continuation of application No. 14/089,886, filed on Nov. 26, 2013, now Pat. No. 9,537,728.

(51) Int. Cl.
*H04L 12/24* (2006.01)
*G06F 9/00* (2006.01)
*G06F 9/46* (2006.01)

(52) U.S. Cl.
CPC .. *H04L 41/5019* (2013.01); *G06F 2209/5011* (2013.01)

(56) References Cited

U.S. PATENT DOCUMENTS

| | | |
|---|---|---|
| 7,451,183 B2 | 11/2008 | Romero et al. |
| 7,500,001 B2 | 3/2009 | Tameshige et al. |
| 7,937,493 B2 | 5/2011 | Colrain et al. |
| 8,261,277 B2 | 9/2012 | Prabhakar et al. |
| 8,386,607 B2 | 2/2013 | Hu et al. |
| 9,208,032 B1 | 12/2015 | McAlister et al. |
| 2005/0102674 A1 | 5/2005 | Tameshige et al. |
| 2006/0129687 A1 | 6/2006 | Goldszmidt et al. |
| 2010/0088205 A1 | 4/2010 | Robertson |
| 2011/0191781 A1 | 8/2011 | Karanam et al. |
| 2012/0222042 A1 | 8/2012 | Chess et al. |

OTHER PUBLICATIONS

Padala, et al., "Automated Control of Multiple Virtualized Resources", EuroSys, '09, Apr. 1-3, 2009, Nuremberg, Germany, ACM 978-1-60558-482-9/09/04, <http://ants.iis.sinica.edu.tw/3BkMJ9ITeWXTSrrvNoKNFDxRm3zFwRR/91/Automated%20Control%20of%20Multiple%20Virtualized%20Resources.pdf>.

Ribbens, et al., "ReSHAPE: A Framework for Dynamic Resizing and Scheduling of Homogeneous Applications in a Parallel Environment", Mar. 2007, <http://arxiv.org/pdf/cs/0703137>.

Dang Tran et al., "SLA-aware virtual resource management for cloud infrastructures", 2009, <http://hal.inria.fr/docs/00/47/47/22/PDF/CIT2009.pdf>.

IBM, "IBM Platform Symphony V6.1 enables scalable, high-performance grid services for parallel compute- and data-intensive analytic applications", IBM United States Software Announcement 212-426, dated Nov. 13, 2012.

List of IBM Patents or Patent Applications Treated as Related, Appendix P, Filed Herewith, 2 pages.

Chin, et al., "Minimizing Service Restart by Optimially Resizing Service Pools", U.S. Appl. No. 14/089,886, filed Nov. 26, 2013, now U.S. Pat. No. 9,527,728, issued Jan. 3, 2017.

Chin, et al., "Minimizing Service Restart by Optimially Resizing Service Pools", U.S. Appl. No. 14/162,057, filed Jan. 23, 2014, now U.S. Pat. No. 9,596,148, issued Mar. 14, 2017.

Chin, et al., "Minimizing Service Restart by Optimially Resizing Service Pools", U.S. Appl. No. 15/427,113, filed Feb. 8, 2017.

MINIMIZING SERVICE RESTART BY OPTIMALLY RESIZING SERVICE POOLS

STATEMENT REGARDING PRIOR DISCLOSURES BY THE INVENTOR OR A JOINT INVENTOR

The following disclosure(s) are submitted under 35 U.S.C. 102(b)(1)(A): DISCLOSURE(S): Product release Announcement titled "IBM Platform Symphony V6.1 enables scalable, high-performance grid services for parallel compute- and data-intensive analytic applications", for a product made publicly available on Dec. 14, 2012, page(s) 2, Planned Availability Date section, (www.ibm.com/common/ssi/ShowDoc.wss?docURL=/common/ssi/rep_ca/6/897/ENUS212-426/index.html&lang=en&request_locale=en).

BACKGROUND OF THE INVENTION

The present invention relates generally to the field of operation of aggregate computing resources, and more particularly to dynamic resource sharing and service level agreement (SLA) enforcement.

Environments in which computing resources are shared by multiple entities, such as an enterprise environment, typically have multiple applications that consume services from grid resources. Each application can use more than one type of service, and may be associated with one or multiple consuming entities, for example, different business units within an enterprise organization.

Management of shared computing resources can involve providing an agreed-to level of resources, referred to as a service level agreement (SLA), for each entity sharing resources within an interconnected consolidation of computing resources known as a cluster or grid. Management of shared computing resources also requires efficiency in utilization of resource assets, minimizing idle time, but enabling dynamic sharing of resources as demands of consuming entities vary with respect to time.

In a distributed computing grid environment, client applications submit workload requests to a workload manager. The workload requests generate sessions that include tasks that the workload manager schedules on available resources that can be "deserved" or shared. A "deserved" level or resources aligns with the agreed-to resource level of a SLA, for an application associated with a consuming entity of a distributed computing grid. Shared resources may be allowed under SLA management when resources are idle such that a client application may consume resources above the agreed-to level of its SLA as long as resource demand is below capacity. However, shared resources may be reclaimed by another client application, when its workload demand increases and resources previously idle are now required.

When a client application associated with an entity of the distributed computing grid, submits a large workload to a workload manager, the workload manager will request additional resources to execute the high demand of workload. The resource manager consults a resource plan to determine the agreed-to resources and allocates the agreed-to level of resources to the workload manager for the client application. If additional resources are required by the submitted workload and resources are idle, the resource manager may allocate additional resources to the requesting workload manager to perform workload demand in excess of the agreed-to resource level.

An area of concern in maintaining high efficiency levels in a shared computing grid is the time needed to start or initialize a service instance, especially for cases in which the service instance has to load a large software library or a large amount of data at initialization. If such service instances are started and terminated frequently, performance will suffer for the application calling the service instances.

When resource consumption of a service operating on a specific resource, referred to as a "slot", is very large, there is a risk of overloading the slot. Avoiding situations in which multiple services with large memory consumption occupy a slot at the same time, is preferred to prevent performance issues resulting from the operating system resorting to swapping in order to free memory.

BRIEF SUMMARY

Embodiments of the present invention disclose a method, computer program product, and system for optimizing service pools supporting resource sharing and enforcing SLAs, to minimize service restart. A computer processor determines a first resource to be idle, wherein a service instance continues to occupy the first resource that is idle. The computer processor returns the first resource determined to be idle, to a resource pool, wherein the service instance continues to occupy the first resource as a global standby service instance on the first resource, added to the resource pool. The computer processor receives a request for a resource, wherein the request for the resource includes a global name associated with a service that corresponds to the global standby service instance, and the computer processor allocates, from the resource pool, the first resource having the global standby service instance, based on the request for the resource that includes the global name associated with the service corresponding to the global standby service instance.

DETAILED DESCRIPTION

Figure 1:
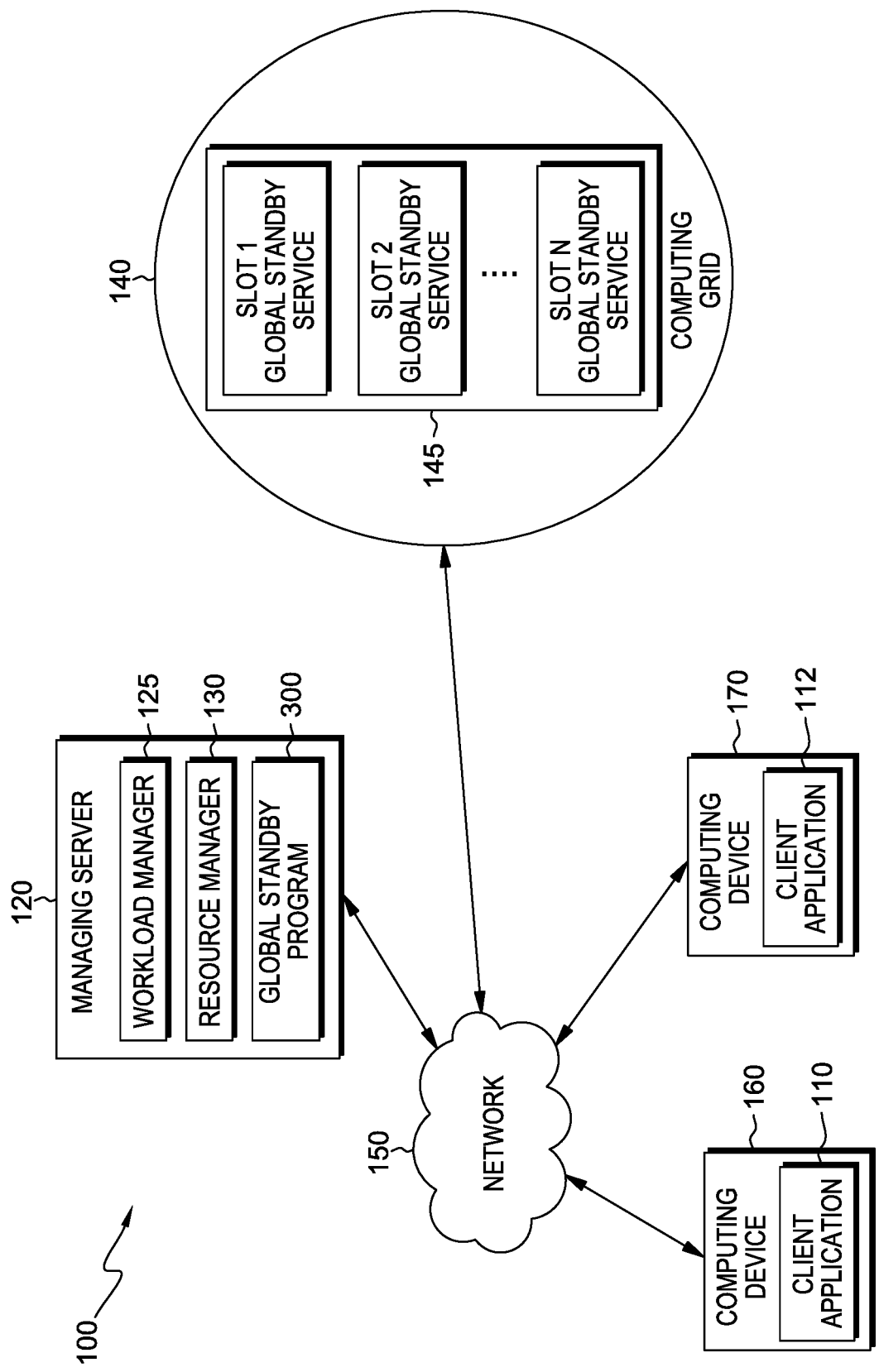
FIG. 1 is a functional block diagram illustrating a distributed computing grid environment, in accordance with one embodiment of the present invention.

Embodiments of the present invention recognize that service pool resizing enables being able to share resources amongst different applications and different entity consumers of grid resources. Applications submitting workload requests for services include tasks that are run within service instances. Embodiments also recognize that initializing service instances can affect performance, specifically when the service instance has to load a large software library or a large quantity of data and/or the service instance is terminated and restarted frequently.

An approach suggested to address the potential performance issues includes using a standby service, in which a service instance initiated on a resource is not terminated after a scheduled task running within the service instance is complete. However, embodiments of the present invention recognize that the service instance remaining on the resource can only be reused by the same application that initiated the service instance, thus limiting its effectiveness and value. Embodiments of the present invention include a global standby service in which a service is identified by a global name, and used by workload resource requests, such that other applications in the distributed computing grid environment using the same service are able to re-use the actively running service instance on an available resource, regardless of which application initiated the service instance.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer readable program code/instructions embodied thereon.

Any combination of computer-readable media may be utilized. Computer-readable media may be a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer-readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

The present invention will now be described in detail with reference to the Figures. FIG. 1 is a functional block diagram illustrating distributed computing grid environment 100, in accordance with one embodiment of the present invention. Distributed computing grid environment 100 includes managing server 120, computing grid 140, and computing devices 160 and 170, all interconnected through network 150. Computing grid 140 includes resource slots 145. Managing server 120 includes workload manager 125, resource manager 130, and global standby program 300. Managing server 120 also includes middleware, which is computer software that provides services to software applications beyond those available from the operating system. Middleware is commonly used for software that enables communication and management of data in distributed applications, and as such workload manager 125, resource manager 130 and global standby program 300 can operate within the middleware of managing server 120.

Network 150 can be, for example, a local area network (LAN), a wide area network (WAN) such as the Internet, or a combination of the two, and can include wired or wireless connections. In general, network 150 can be any combination of connections and protocols that will support communications via various channels between client computing devices 160 and 170, managing server 120 and computing grid 140, in accordance with an embodiment of the present invention.

Computing devices 160 and 170 are components of distributed computing grid environment 100 capable of operating one or more applications that submit workload sessions that include tasks to workload manager 125. Computing device 160 includes client 110, and computing device 170 includes client 112. Clients 110 and 112 are application programs capable of submitting session requests to workload manager 125, to run the tasks within respective sessions on resource slots 145 available in computing grid 140.

Computing devices 160 and 170 can each be a laptop computer, a specialized mobile computer server, a tablet, or netbook personal computer (PC), a personal digital assistant (PDA), a smart phone, or any computing device capable of downloading and operating an app from a network connection. In general, computing devices 160 and 170 are representative of any programmable electronic device or combination of programmable electronic devices capable of executing machine-readable program instructions. Computing devices 160 and 170 include internal and external hardware components, as depicted and described in further detail with respect to FIG. 4.

Computing grid 140 is an aggregate interconnected group of resources that work together to perform tasks scheduled on the resource slots 145. The resources of computing grid 140 are managed by resource manager 130 and the tasks run on the resources of computing grid 140 are scheduled and managed by workload manager 125. Computing grid 140 includes resource slots 145 which represent the "slots" within computing grid 140, which are units of resources to which tasks can be scheduled to be run. Resource slots 145 are managed by resource manager 130 and tasks are scheduled on resource slots 145 by workload manager 125.

Tasks are computations or logic functions that can be executed in parallel in a computing cluster or grid, such as distributed computing grid environment 100. Groupings of one or more tasks form a "session", also referred to as a "job", which acts as a container for tasks. Services provide a software function to a client application, and an application may use different types of services, each providing a unique function. Tasks run within a running instance of a service are referred to as a service instance. A service instance is an application program that can be reused to perform multiple tasks.

Managing server 120 is a computing device that controls the assignment of resources to various client application requests, such as clients 110 and 112 operating on computing devices 160 and 170 respectively. Managing server 120 is a server computing device that can be a desktop computer, laptop computer, a specialized computer server, a client computer, tablet, or netbook personal computer (PC), a personal digital assistant (PDA), a smart phone, a mainframe computer, a web server computer, or a networked server computer. Further, managing server 120 can represent computing systems utilizing clustered computers and components to act as single pools of seamless resources when accessed through network 150, as is common in data centers and with cloud computing applications. In general, managing server 120 is representative of any programmable electronic device or combination of programmable electronic devices capable of executing machine-readable program instructions. Managing server 120 may include internal and external hardware components, as depicted and described in further detail with respect to FIG. 4.

Managing server 120 includes workload manager 125, resource manager 130, and global standby program 300. Managing server 120 includes an operating system (OS) program layer, a middleware program layer, and an application program layer. The middleware program layer can include workload manager 125, resource manager 130, and global standby program 300. Resource manager 130 is a component of distributed computing environment 100 that controls allocation and adjustment of resources used to perform tasks as submitted by client applications with access to computing grid 140. Resource manager 130 responds to resource demands from workload manager 125 by allocating at least a minimum agreed-to level of resources of computing grid 140 if required by the demand.

The level of allocation is based on a policy or an established SLA of resources "deserved" by a client application when the application submits workload requests to workload manager 125. "Deserved" resources are the quantity of resources that must be allocated to a client application by the resource manager, as specified in the agreed-to policy or SLA, based on the level of workload demand. If the workload demand is high enough, resource manager 130 allocates the deserved level of resources to workload manager 125, possibly having to reclaim resources being shared by other applications. If resource use is below the capacity level, resource manager 130 may determine if there are idle resources from under-using entities, and based on the workload demand, may allocate resources from an idle resource pool to workload manager 125 for use in executing the workload demand. This practice is known as "sharing" resources and makes idle resources available to entities with high demand that can benefit from use of additional available resources. In this manner resources are used to achieve higher efficiencies in an environment in which resources are shared, such as distributed computing grid environment 100.

Workload manager 125 resides on the middleware of managing server 120. Workload manager 125 manages and schedules the tasks included in session requests received from a client application, such as client application 110. Workload manager 125 requests resources from resource manager 130 in response to receiving workload demand from client application 110. Workload manager 125 determines the scheduling priority of tasks given the available resources and tasks are scheduled to resource "slots", such as resource slots 145, and run to completion on the scheduled slot. When workload manager 125 has no additional tasks to run on the allocated slots for client application 110, the slots are returned to resource manager 130 and become part of a pool of idle resources available to allocate to other applications as needed.

Global standby program 300 is a program operating within the middleware of managing server 120. Global standby program 300 works in conjunction with resource manager 130 in interpreting the service type for which resource requests are made by currently running client applications. In one embodiment of the present invention, global standby program 300 may be a separate program called by resource manager 130. In other embodiments, global standby program 300 may be integrated as part of resource manager 130. Global standby program 300 enables a global standby service that runs on the resources within computing grid 140 of distributed computing grid environment 100. Global standby program 300 enables the sharing and reuse of resources which are returned to resource pools and are occupied with service instances that remain available, to improve performance efficiency by avoiding delays from service instance restarts on resources.

Global standby program 300 enables a service instance of a service requested by a client application that is running on a resource to remain running after the executing task has completed or becomes idle. The service instance is not terminated by global standby program 300 when the resource slot becomes idle, but is returned to the idle resource pool of resource manager 130 with the service instance still occupying the resource slot.

Global standby program 300 uses a global name for each global service instance type used by applications submitting workload to be performed on resource slots 145 of computing grid 140. Global names are defined in the application definition file of client applications and identify the services used by the application. Workload managers include the service global name when submitting workload requests. The global name is included when the workload manager 125 requests resources from resource manager 130, for its workload demand. Resource manager 130 uses the global name to identify resource slots occupied by service instances matching the global name.

Resource manager 130 preferentially allocates resource slots with matching global name service instances to meet the resource request of workload manager 125, if such resource slots are available. As a second priority, resource manager 130 allocates resource slots that are free of any service instances occupying the slot, from the idle resource pool. As a low priority, if resource manager 130 is unable to meet the resource request for a workload manager demand by matching resource slots occupied with service instances matching the global name of the requested service, or is unable to meet deserved resource levels by allocating resource slots free of service instances, resource manager 130 terminates service instances occupying resource slots of the idle resource pool (or reclaimed slots) and allocates the resource slots to fulfill the demand of the requesting workload manager.

Service instances are cached for reuse once an application does not need them anymore. The service instance is terminated only if there are insufficient empty slots to meet the demand for applications that can't use the cached service instance.

Initiation of a service instance may be lengthy, especially if it requires loading a large software library or large quantities of data. Performance issues may result from frequent starting and terminating of service instances. Global standby program 300 allows service instances occupying resource slots to be reused without the performance issues of frequent starting and terminating, and in addition allows service instances occupying resource slots in idle resource pools to be used by other applications requiring the same service.

Figure 2:
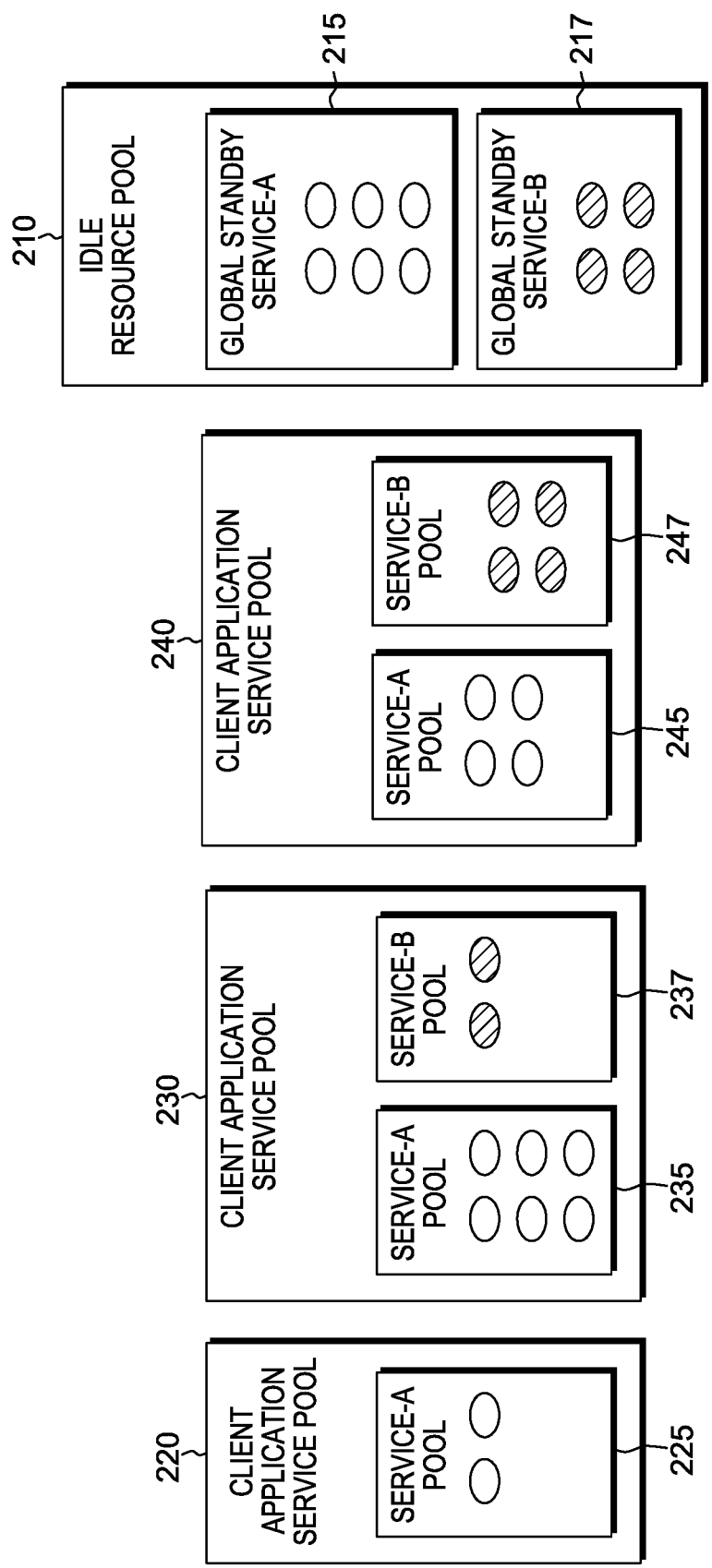
FIG. 2 is a functional block diagram of an exemplary illustration for service instance reuse across client applications, in accordance to an embodiment of the present invention.

FIG. 2 is a functional block diagram of an exemplary illustration for service instance reuse across client applications, in accordance to an embodiment of the present invention. Idle resource pool 210 is a collection of resource slots, hereafter referred to as slots that are not allocated to an application and are not executing tasks. The slots in FIG. 2 are depicted as ovals. Idle resource pool 210 includes slots that are available for resource manager 130 to allocate to workload manager 125 to meet the workload requests of a client application, such as client application 110. Slots from idle resource pool 210 are allocated as needed, and when the slots are idle, they are returned to idle resource pool 210.

As depicted, the slots in idle resource pool 210 are all occupied by a service instance. The applications in the exemplary illustration use one or both of two services available. Global standby service-A 215 is the portion of idle resource pool 210 having slots occupied by service instances of service-A. Global standby service-B 217 is the portion of idle resource pool 210 having slots occupied by service instances of service-B. The service instances occupying the slots are available to run tasks using the respective services.

Client application service pool 220 includes one pool of slots on which service instances of a service are running to execute tasks. Client application service pool 220 includes service-A pool 225 containing slots with running services instances of service-A. Similarly, client application service pool 230 and client application service pool 240 include two pools of slots running service instances on which tasks are executing. Client application service pool 230 includes service-A pool 235 and service-B pool 237 each containing slots running service instances of their respective service. Client application service pool 240 includes service-A pool 245 and service-B pool 247, each containing slots running service instances of their respective service.

In an embodiment of the present invention, the client application associated with client application service pool 230 submits additional workload to its corresponding workload manager, for example, resource manager 130 (FIG. 1), and the workload manager responds by requesting additional resources from the workload manager, for example, workload manager 125. The client application, for example, client application 110, indicates the service needed by including the global name of the service, for example service-B, when submitting the additional workload. The workload manager includes the global name of service-B in the request for resources sent to the resource manager, and the resource manager determines if slots in idle resource pool 210 match the global name of service-B, needed for the requested resources. If a match is found, the slots occupied by service-B instances, which match the global name, are allocated by resource manager 130 to workload manager 125 to perform the service on scheduled tasks.

If a client application, such as client application 112 (FIG. 1), associated with client application service pool 240, has completed tasks running on slots in service-B pool 247, the slots become idle and workload manager 125 returns the idle slots to resource manager 130. The service-B instances on the idle slots are not terminated, but continue to occupy the returned slots, and the slots are added to global standby service-B 217 of idle resource pool 210.

Figure 3:
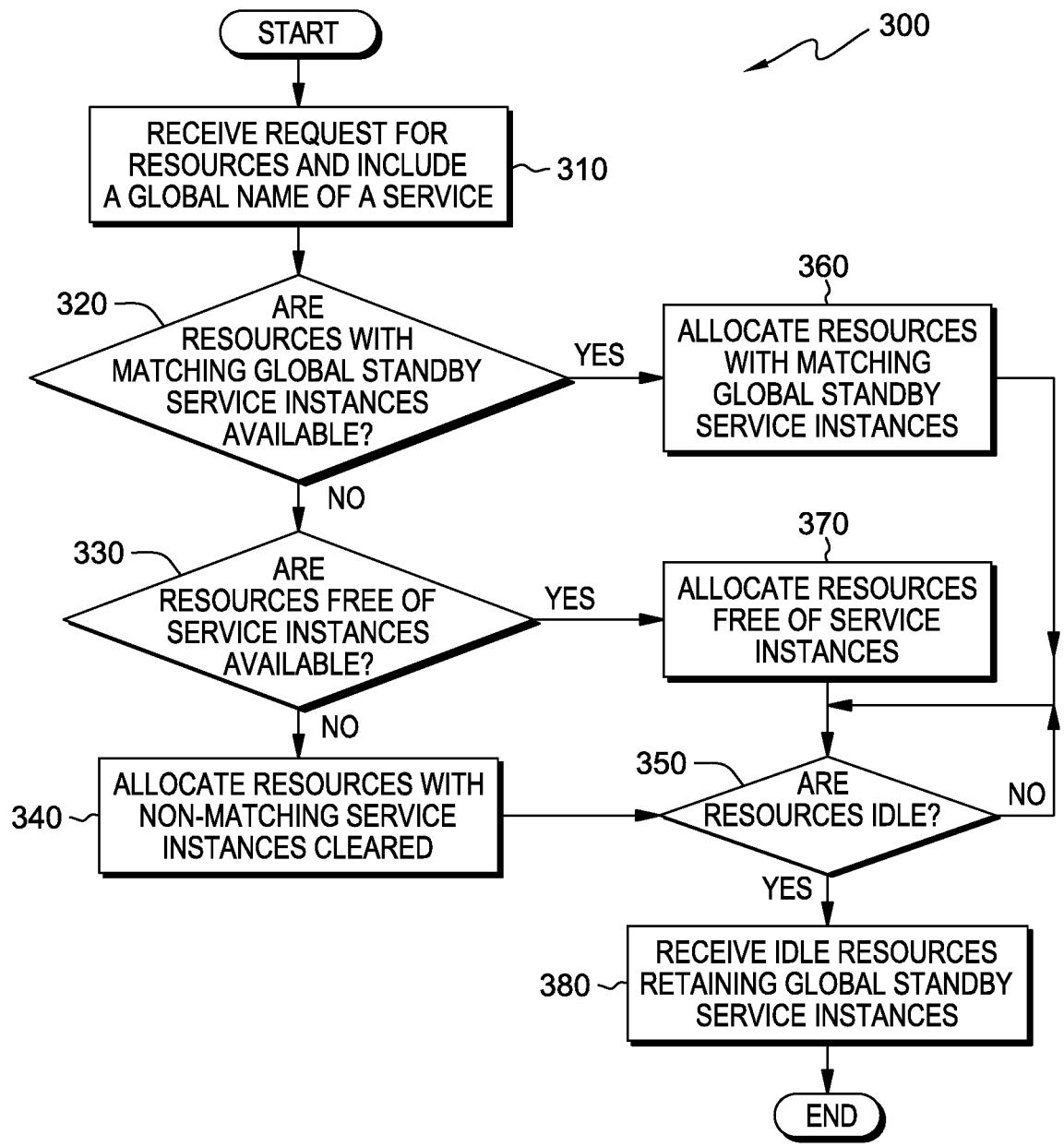
FIG. 3 illustrates operational steps of a global standby program, operating on a middleware layer of a managing server within the distributed computing grid environment of FIG. 1, in accordance with an embodiment of the present invention.

FIG. 3 is a flowchart depicting the operational steps of global standby program 300, in accordance to an embodiment of the present invention. Global standby program 300 works in conjunction with resource manager 130 and workload manager 125. Global standby program 300 receives a request for resources that includes a global name of a service (step 310). Global standby program 300 receives a request for resources needed by a client application and receives a global name associated with the service needed to perform workload tasks. The global name associated with the service is defined in the application definition file of each application that uses the service. This allows a service instance of the global named service to be consistently used across other applications submitting workload to the resources of the computing grid.

For example, global standby program 300 receives a request for slots from idle resource pool 210 (FIG. 2), from client application 110, and receives a global name of a service, such as service-B (FIG. 2). Global standby program 300 recognizes that the resource request intends to use service-B to complete a workload for which the slots are requested.

Global standby program 300 determines if resources with matching global standby service instances are available, and determining that resources with matching global standby service instances are available (decision step 330, "YES" branch), global standby program 300 allocates resources with matching global standby service instances (step 360). Global standby program 300 uses the global name associated with a service to identify resources with a matching service instance occupying the resource.

For example, global standby program 300 uses the global name associated with a service, such as service-B, that was received in the resource request from workload manager 125, and identifies if there are slots in idle resource pool 210 that have service-B service instances running on the slots. Determining that there are slots with service-B service instances in idle resource pool 210, global standby program 300 allocates the slots with the matching service-B service instances to workload manager 125.

Having allocated the resources with matching global standby service instances, the tasks are run and completed within the service instances of the resources. Global standby program 300 determines if the resources are idle, and confirming the resources of completed tasks are idle (decision step 350, "YES" branch), global standby program 300 receives idle resources retaining the global standby service instances (step 380). Global standby program 300 does not terminate the service instances of the returned resources; however, the service instances are cached and remain available to be used by the same application or another application to perform tasks requiring this service. The resources with global standby service instances are returned to an idle resource pool of the resource manager and global standby program 300 ends.

For example, global standby program 300 determines if resources are idle. In one embodiment of the present invention, the task scheduled on the resource slot may inform global standby program 300 that the task is complete, or is in a waiting state, and the resource slot is available. Global standby program 300 receives control of an idle resource running a service instance of service-B. Global standby program 300 does not terminate the service instance, leaving the service instance of service-B occupying the resource slot. Global standby program 300 returns the idle program with the service instance of service-B to idle resource pool 210, making the slot available. Having a running service instance of service-B on the slot makes using the slot for service-B much more efficient, avoiding data loading delays and clearing activities associated with frequent starting and ending actions, respectively.

If global standby program 300 determines that resources with matching global standby service instances are not available, (decision step 320, "NO" branch), global standby program 300 determines if resources free of service instances are available, and determining that resources free of service instances are available (decision step 330, "YES" branch), global standby program 300 allocates resources free of service instances (step 370).

For example, global standby program 300 preferentially allocates resources to workload manager 125 that have standby service instances running that match the service identified by the global name received with the workload request. Having determined that resource slots having global standby service instances matching the service associated with the global name, such as service-B, are not available, global standby program 300 determines if there are resource slots available that are free of global standby service instances. Resource slots free of service instances may be used to initiate any service; however, performance penalties may be experienced due to loading requirements at the start of the service instance. This preference leaves resource slots occupied by other global standby service instances, available for application resource requests that require other service instances, for example, service-A.

If global standby program 300 determines that resources free of service instances are not available (decision step 330, "NO" branch), global standby program 300 terminates the global standby service instances and allocates the resources with service instances cleared (step 340). Having exhausted preferences of allocating resources, global standby program 300 terminates the global standby service instances occupying the resources, freeing the resources to initiate the required service instances without potentially overloading the resources by leaving a previously running service instance occupying the resource as a new service instance of a different service is started.

As resources complete scheduled tasks, global standby program 300 determines if resources are idle, and determining that resources are not idle global standby program 300 monitors to determine if resources are idle (decision step 350, "NO" branch).

Figure 4:
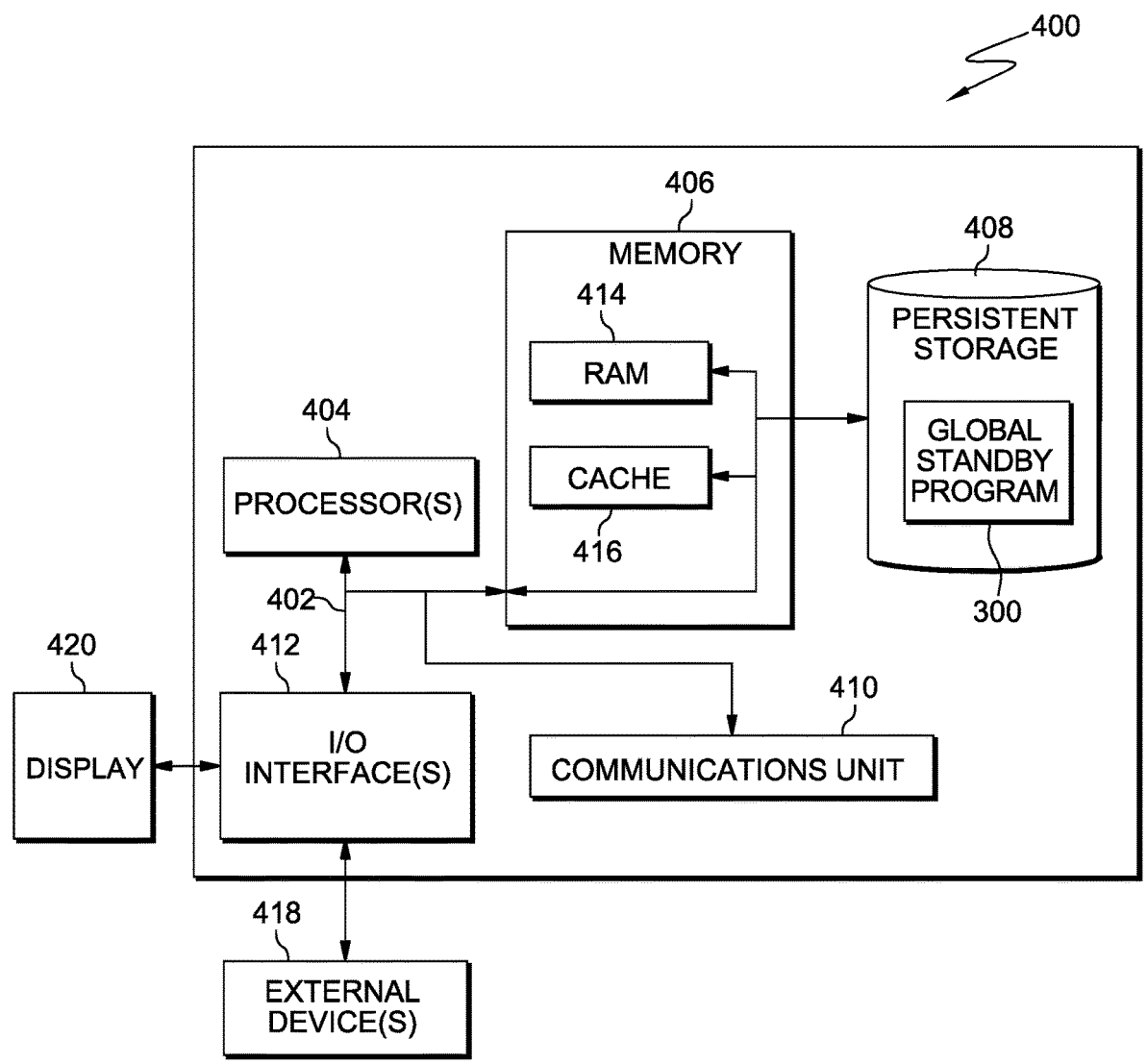
FIG. 4 depicts a block diagram of components of a managing server capable of operating the global standby program, in accordance with an embodiment of the present invention.

FIG. 4 depicts a block diagram of components of a managing host server 400, capable of operating global standby program 300, in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Server computer 400 includes communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer-readable storage media. In this embodiment, memory 406 includes random access memory (RAM) 414 and cache memory 416. In general, memory 406 can include any suitable volatile or non-volatile computer-readable storage media.

Global standby program 300 is stored in persistent storage 408 for execution by one or more of the respective computer processors 404 via one or more memories of memory 406. In this embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer-readable storage medium that is also part of persistent storage 408.

Communications unit 410, in these examples, provides for communications with other data processing systems or devices, including resources of distributed computing grid environment 100. In these examples, communications unit 410 includes one or more network interface cards. Communications unit 410 may provide communications through the use of either or both physical and wireless communications links. Global standby program 300 may be downloaded to persistent storage 408 through communications unit 410.

I/O interface(s) 412 allows for input and output of data with other devices that may be connected to managing host server 400. For example, I/O interface 412 may provide a connection to external devices 418 such as a keyboard, keypad, a touch screen, and/or some other suitable input device. External devices 418 can also include portable computer-readable storage media such as, for example, thumb drives, portable optical or magnetic disks, and memory cards. Software and data used to practice embodiments of the present invention, e.g., global standby program 300, can be stored on such portable computer-readable storage media and can be loaded onto persistent storage 408 via I/O interface(s) 412. I/O interface(s) 412 also connect to a display 420.

Display 420 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for optimizing utilization of resources of a resource pool within a computing grid environment supporting resource sharing, the method comprising:
    a computer processor allocating a first resource of a resource pool to a request by a first application for a service instance of a first service, wherein the request for the first service and the service instance of the first service from the first application includes a first global name corresponding to the first service;
    the computer processor determining the first resource that includes the service instance of the first service occupying the first resource to be idle;
    the computer processor returning the first resource, determined to be idle, to the resource pool, wherein the service instance of the first service continues to occupy the first resource as a global standby service instance occupying the first resource and maintaining the first global name corresponding to the first service; and
    the computer processor allocating the first resource from the resource pool, in which the service instance of the first service continues to occupy the first resource as a global standby service instance and maintains the first global name corresponding to the first service, to a second request from a second application for the service instance of the first service, wherein the request for the service instance of the first service from the second application includes the first global name.

2. The method of claim 1, wherein resources within a computing grid environment occupied by global standby service instances are shared while a demand for resources remains below a service level agreement (SLA) agreed-to level.

3. The method of claim 1, further comprising:
    the computer processor preferentially allocating a resource free of global standby service instances instead of terminating the service instance of the first service occupying the first resource, in response to determining that the first resource having a matching global standby service instance is unavailable.

4. The method of claim 1, further comprising:
    the computer processor receiving a request for a second resource, wherein the request for the second resource includes a second global name corresponding to a global standby service of a second service;
    the computer processor determining whether a respective resource available for allocation from the resource pool is occupied by a service instance of the global standby service of the second service; and
    in response to determining the respective resource occupied by the global standby service of the second service as unavailable, the computer processor determining whether the respective resource free of a service instance of the global standby service of the first service is available; and
    in response to determining the respective resource free of a service instance of the global standby service of the first service as unavailable, the computer processor allocating the second resource by terminating the first service occupying the second resource.

5. The method of claim 1, wherein the global standby service instance occupies more than one resource.

6. The method of claim 1, wherein a resource of the resource pool is a processor resource slot within a distributed computer processing environment.

7. The method of claim 1, wherein the service instance of the global standby service of the first service remains available to one or more applications requiring the first service by caching the service instance on the first resource.

8. The method of claim 1, wherein the first resource occupied by the first service is determined to be idle in response to detection of a waiting state.

9. The method of claim 1, wherein the first resource is occupied by more than one global standby service instances, and wherein memory occupied by the more than one global standby service instances is below an overload limit of the resource.

10. A computer program product for optimizing utilization of resources of a resource pool within a computing grid environment supporting resource sharing, the computer program product comprising:

one or more computer-readable hardware storage device(s) and program instructions stored on the one or more computer-readable hardware storage device(s), the program instructions comprising:

program instructions to allocate a first resource of a resource pool to a request by a first application for a service instance of a first service, wherein the request for the first service and the service instance of the first service from the first application includes a first global name corresponding to the first service;

program instructions to determine the first resource that includes the service instance of the first service occupying the first resource to be idle;

program instructions to return the first resource, determined to be idle, to the resource pool, wherein the service instance of the first service continues to occupy the first resource as a global standby service instance occupying the first resource and maintain the first global name corresponding to the first service; and program instructions to allocate the first resource from the resource pool, in which the service instance of the first service continues to occupy the first resource as a global standby service instance and maintains the first global name corresponding to the first service, to a second request from a second application for the service instance of the first service, wherein the request for the service instance of the first service from the second application includes the first global name.

11. The computer program product of claim 10, wherein resources within a computing grid environment occupied by the service instances of the global standby service of the first service are shared while a demand for resources remains below a service level agreement (SLA) agreed-to level.

12. The computer program product of claim 10, further comprising:

program instructions to preferentially allocate a resource free of global standby service instances instead of terminating the service instance of the first service occupying the first resource, in response to determining that the first resource having a matching global standby service instance is unavailable.

13. The computer program product of claim 10, further comprising:

program instructions to receive a request for a second resource, wherein the request for the second resource includes a second global name corresponding to a global standby service of a second service;

program instructions to determine whether a respective resource available for allocation from the resource pool is occupied by a service instance of the global standby service of the second service; and in response to determining the respective resource occupied by the global standby service of the second service as unavailable, program instructions to determine whether the respective resource free of a service instance of the global standby service of the first service is available; and in response to determining the respective resource free of a service instance of the global standby service of the first service as unavailable, program instructions to allocate the second resource by terminating the first service occupying the second resource.

14. The computer program product of claim 10, wherein the service instance of the global standby service of the first service occupies more than one resource.

15. A computer system for optimizing utilization of resources of a resource pool within a computing grid environment supporting resource sharing, the computer system comprising:

one or more computer processors;

one or more computer-readable hardware storage devices;

program instructions stored on the computer-readable hardware storage devices for execution by at least one of the one or more processors, the program instructions comprising:

program instructions to allocate a first resource of a resource pool to a request by a first application for a service instance of a first service, wherein the request for the first service and the service instance of the first service from the first application includes a first global name corresponding to the first service;

program instructions to determine the first resource that includes the service instance of the first service occupying the first resource to be idle;

program instructions to return the first resource, determined to be idle, to the resource pool, wherein the service instance of the first service continues to occupy the first resource as a global standby service instance occupying the first resource and maintain the first global name corresponding to the first service; and program instructions to allocate the first resource from the resource pool, in which the service instance of the first service continues to occupy the first resource as a global standby service instance and maintains the first global name corresponding to the first service, to a second request from a second application for the service instance of the first service, wherein the request for the service instance of the first service from the second application includes the first global name.

16. The computer system of claim 15, wherein a resource of the resource pool is a processor resource slot within a distributed computer processing environment.

17. The computer system of claim 15, wherein the service instance of the global standby service of the first service remains available to one or more applications requiring the first service by caching the service instance on the first resource.

18. The computer system of claim 15, wherein the first resource occupied by the first service is determined to be idle in response to detection of a waiting state.

19. The computer system of claim 15, wherein the first resource is occupied by more than one global standby service instances, and wherein memory occupied by the more than one global standby service instances is below an overload limit of the resource.

20. The computer system of claim 15, further comprising:

program instructions to receive a request for a second resource, wherein the request for the second resource includes a second global name corresponding to a global standby service of a second service;

program instructions to determine whether a respective resource available for allocation from the resource pool is occupied by a service instance of the global standby service of the second service; and in response to determining the respective resource occupied by the global standby service of the second service as unavailable, program instructions to determine whether the respective resource free of a service instance of the global standby service of the first service is available; and in response to determining the respective resource free of a service instance of the global standby service of the first service as unavailable, program instructions to allocate the second resource by terminating the first service occupying the second resource.

\* \* \* \* \*